Sept. 12, 1967    J. F. McCANN    3,340,745

VIBRATIONLESS TIMING CHAIN

Filed Nov. 15, 1965

INVENTOR.
JOHN F. MC CANN

BY  *Kenwood Ross*

ATTORNEY.

United States Patent Office 3,340,745
Patented Sept. 12, 1967

3,340,745
VIBRATIONLESS TIMING CHAIN
John F. McCann, Longmeadow, Mass., assignor to Acme Chain Corporation, Holyoke, Mass., a corporation
Filed Nov. 15, 1965, Ser. No. 507,903
4 Claims. (Cl. 74—253)

My invention relates to timing chains and more particularly to a vibrationless timing chain designed to counteract vibration due to "chain whip."

One primary object of the invention is to provide a restricted action chain whereby destructive joint action is effectively eliminated.

Another chief object is to provide a chain which flexes only in one direction as it operates on a cooperant sprocket or sprockets thereby precluding chain whip and vibration caused by speed and load variations.

The chain is conducive to quieter operation than chains of the prior art and reduces the rapid wear associated with conventional full flexure chains.

High frequency vibration occurs at critical speeds in internal combustion engine applications; such vibration is absorbed and smoothed out by the use of the restricted action chain hereof.

Multiple catenary action is associated with worn chains on fixed center drives due to a fouling of the last few teeth of the sprocket on the loose strand of the drive. Such multiple catenary action cannot occur with a chain embodying the features of the invention for the reason that the chain hereof disengages itself from its associated sprocket such as a crankcase sprocket in a smooth cycloidal curve.

The life of a timing chain is ordinarily limited by pitch elongation due to wear of the load carrying joints which finally results in failure of the chain properly to match with the sprocket teeth. Pitch elongation in the chain hereof is limited by the provision of a long, projected bearing area on each of the case hardened pins made from carefully selected analyses of steels.

The strength of the chain hereof is adequate to handle any loads imposed upon a timing chain drive, and the simplicity of its construction eliminates that multiplicity of joint members so commonly used on so-called silent or inverted tooth chains.

The invention seeks, as a final object and accomplishment, to provide a timing chain assembly particularly characterized by a design arrangement more advantageously and satisfactorily to perform the functions required of it and adapted to provide a compact unit which successfully combines the factors of structural simplicity and durability, and yet is economical in its manufacture.

These and other objects and advantages of the invention will become more readily apparent by reference to the following specification and accompanying drawing, in which.

Figure 1:
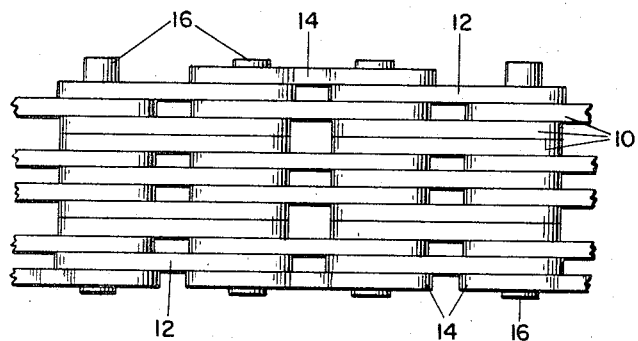
FIG. 1 is a fragmentary top plan view of a timing chain embodying the invention.

In devising a link for the silent chain, it has been assumed that the general outline of the link will follow closely the form of link commonly in use, which is shaped to conform with standard sprocket teeth, and that the simplest form of aperture will be a circle. It has been assumed that the link should be symmetrical, with both apertures identical in shape. Starting with such a link, if we lay out a pintle pin having a convex surface of suitable radius, preferably substantially equal to ⅗ the pitch of the chain, while the remaining surface of the pintle conforms to the outline of a circle, we find that to permit the extreme rocking movement, the circular aperture must be considerably larger in diameter than the outside diameter of the pintle, or, in other words, maximum clearance must be provided to permit the desired articulation of the chain. This amount of clearance is undesirable, since it would permit relative movement of the pintle pins and the links, and introduces a considerable element of wear, thus permitting continuous stretching of the chain in use.

In order that there may be a true rolling contact, it is desirable that the pintle pin remain stationary with respect to the links with which it is in contact. Accordingly, if a portion of the rear face of each pintle pin is removed to form flattened surfaces, and one side of each of the apertures at opposite ends of the overlapping links is correspondingly flattened to conform to these flattened surfaces, each pintle pin will rest with its flattened face against the flattened edges of the apertures in the links which it engages, we find then, that within the range of articulation of the chain, the pintle pins, with the provision of relatively slight amount of clearance, will move entirely within the apertures in the adjacent links without binding when the pintles are rocked. Thus, we are enabled to produce an extremely simple chain, every link of which is symmetrical, with apertures which are fundamentally circles.

In the usual practice, a chain is designed for 30° of articulation between adjacent links to permit the chain to travel around the sprocket, and for 10° of articulation in the opposite direction to provide for angular displacement of the links, caused by the sag of the chain between the sprockets. The total angle of articulation is, therefore, 40°. A chain such as is herein described, might be employed with relatively large sprockets if the line of contact between the pintle parts was in the center lines of the rocking surfaces; but the degree of movement between the pintle parts would not be uniform on opposite sides of the line of centers, the angles of the arcs traveled during rocking movement being 30° below this line and 10° above.

In order that the angular movement between the pintle parts on opposite sides of the center lines of the rocking surfaces may be uniform, it is preferred to tilt the pintle pins preferably at an angle of 10°, so that the line of the pintle pin when the chain is straight, is below the center line of the rocking surfaces. This arrangement permits the full angular displacement of the links relatively to each other, i.e., 30°, permitting the chain to travel about the smallest sprockets, while, at the same time, insuring the minimum aperture possible with the least clearance between the apertures and the pintle. The result is a chain of maximum strength, in which the stretch during the wearing in period is reduced to a minimum.

Figure 2:
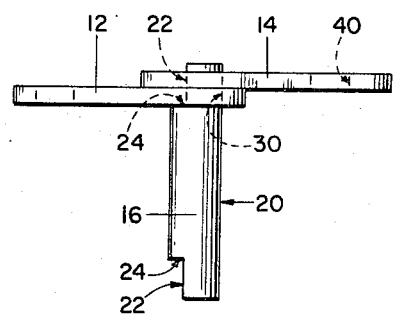
FIG. 2 is a top plan view of one of the pintle pins of the timing chain of FIG. 1 with certain of the chain links omitted for clarity.

With detailed references now to the drawing, I have shown in FIGS. 1 and 2 a portion of an endless timing chain comprising inside links 10, guide links 12 and outside links or plates 14, all mounted upon pintle pins 16.

As shown, the inside links are formed to conform with standard sprocket teeth and are each provided with a pair of spaced circular openings 18 through which a circular central portion 20 of pintle pin 16 is freely extendable wherefore the inside links are freely rotatable thereon.

A portion of the peripheral face of each pintle pin is removed at opposite ends thereof to provide an inwardly-extending flat portion 22 at each end of the pintle pin, each such flat portion additionally defining a shoulder 24 where it meets central portion 20 of the pintle pin.

The guide links 12 are disposed on the pintle pins outwardly of inside links 10, with the inner planar face of the guide link bearing against the adjacent shoulder 24 on the pintle pin.

Figure 5:
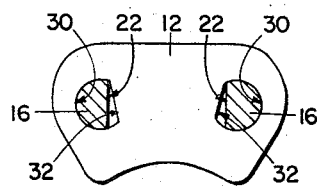
FIG. 5 is a side elevational view of one of the guide links of the timing chain of the invention.
Figure 6:
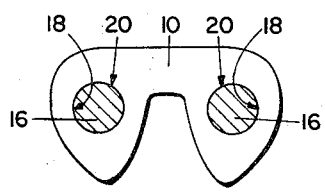
FIG. 6 is a side elevational view of one of the inside links of the timing chain of the invention.
Figure 7:
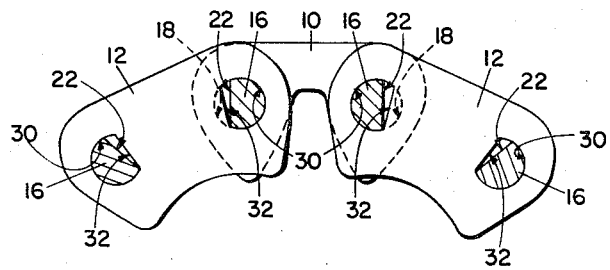
FIG. 7 is a fragmentary side elevational view of a portion of the timing chain of FIG. 3 under flexure with the outside links omitted for clarity.

Each guide link 12 is provided with a pair of spaced generally semi-circular openings 30 having inwardly-facing flat walls 32 which incline outwardly in opposite directions. That is, with reference to FIG. 5, one wall 32 inclines outwardly to the right, while the other wall 32 inclines outwardly to the left as seen in the figure.

The openings 30 are of such size as to permit the ends of the pintle pins to pass freely therethrough, with the flat portion 22 on the pintle pins facing the flat walls 32 of the openings 30, with a small clearance being provided to permit limited rotative movement of the guide links upon the pintle pins.

The outside links or plates 14 are disposed on the pintle pins outwardly of guide links 12, with the inner planar faces of the outside links bearing against the outer planar faces of the guide links.

Each outside link 14 is provided with a pair of spaced generally semi-circular openings 40 having substantially vertically-extending outwardly-facing flat walls 42, the openings 40 being complemental to the end portions of the pintle pins so that the outside links are receivable on such end portions in the manner of a press fit.

Figure 3:
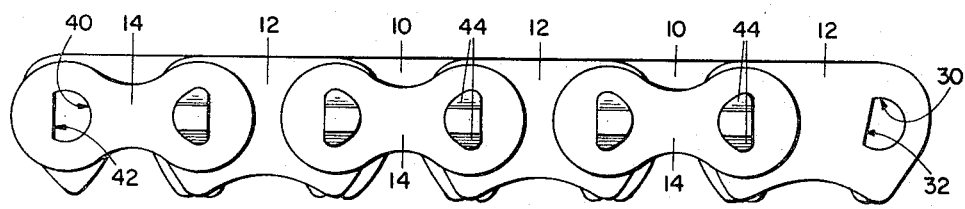
FIG. 3 is a fragmentary side elevational view of a timing chain embodying the invention.
Figure 4:
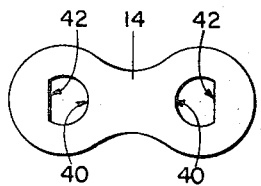
FIG. 4 is a side elevational view of one of the outside links of the timing chain of the invention.

Following assembly of the outside links on the pintle pins, the ends of the pins may be headed over as at 44 in FIG. 3 to lock the outside links to the pins.

The inside links 10 are freely movable upon the pintle pins so that they can readily accommodate to the sprocket with which they will mesh. However, the guide links 12 are permitted only limited movement upon the pins whereby the chain can flex only to the extent dictated by the clearance between the flat portions 22 on the pintle pins and the flat walls 32 of the openings 30 in the guide links.

From the foregoing, it will be understood that the chain as illustrated and described herein, presents numerous advantages over chains as heretofore known and used. For example, in the manufacture of such articles, it is customary to stamp the apertures in a blank and to thereafter use the apertures to center the blanks in a suitable press which cuts the blanks to the desired outline of the links. Obviously, the simplicity of the form of the apertures greatly facilitates this operation, and, moreover, the die employed may be of simple form and is, consequently, less liable to distortion than a die of the complicated shape usually required in manufacturing the links of silent chains. The advantage of a pintle pin of symmetrical and simple form is manifest when it is understood that the complicated pintles heretofore in use have been constructed by drawing metal through dies of the desired shape. When the pintle parts have necessarily small projections and other complicated features, the drawing is extremely difficult and the product is not uniform; whereas a simple rod of the shape of the pintle described herein may be readily drawn and cut to the desired size. The absence of any considerable clearance between the pintle pin and the links materially reduces slipping of the pintle pin, and the consequent wear so that the life of the chain is prolonged. Whatever wear occurs in a chain such as is described herein, is extremely slight, so that its effect is not noticeable for a considerable period. Actual tests of chain, constructed in accordance with the invention, in comparison with other standard forms of chain of this general type, have shown that the stretch in the present chain has been reduced very considerably particularly in the early or wearing in period.

Obviously, various changes may be made in the form and arrangement of the parts within the spirit and scope of the accompanying claims without departing from the invention or sacrificing any of its material advantages.

I claim:

1. In a silent chain, the combination including a plurality of overlapping sets of symmetrical inside links shaped to engage sprocket teeth with each link having a pair of transverse apertures substantially circular in form, articulating pintles disposed in the aligned apertures of the overlapping sets of inside links, each pintle being substantially circular in form except for flat portions at its opposite ends, and guide links each having a pair of transverse apertures substantially circular in form except for flattened walls facing opposite ends of the guide link, the flat portions of the pintles being disposed in the apertures in the guide links with a slight clearance between the flat portions of the pintle and the flattened walls of the apertures in the guide links permitting limited movement of the guide links upon the pintles.

2. In a silent chain according to claim 1 wherein the flattened walls of the apertures in the guide links are inclined and oppositely facing to permit limited flexure of the chain.

3. In a silent chain according to claim 1 including outside links fixed to the flat portions of the pintles outwardly of the guide links.

4. In a silent chain according to claim 3 wherein the outside links are fixed to the flat portions of the pintles in the manner of a press fit to preclude movement of the pintles.

References Cited

UNITED STATES PATENTS

| 959,047 | 5/1910 | Belcher | 74—253 X |
| 1,578,271 | 3/1926 | Dull et al. | 74—253 |
| 1,734,688 | 11/1929 | Morse | 74—253 |
| 2,667,791 | 2/1954 | Bremer | 74—245 |

FOREIGN PATENTS

| 735,715 | 5/1943 | Germany. |

FRED C. MATTERN, JR., *Primary Examiner.*

J. A. WONG, *Assistant Examiner.*